UNITED STATES PATENT OFFICE.

EUGEN FISCHER, OF HÖCHST-ON-THE-MAIN, GERMANY, ASSIGNOR TO THE FARBWERKE, VORMALS MEISTER, LUCIUS & BRÜNING, OF SAME PLACE.

MANUFACTURE OF THE NITRO-LEUCO BASE OF ROSANILINE.

SPECIFICATION forming part of Letters Patent No. 283,766, dated August 28, 1883.

Application filed January 23, 1883. (Specimens.)

*To all whom it may concern:*

Be it known that I, EUGEN FISCHER, a citizen of the Empire of Germany, residing at Höchst-on-the-Main, Germany, have invented certain new and useful Improvements in Coloring-Matter, of which the following is a specification.

My invention relates to an improvement in the preparation of rosaniline, which consists in employing a new method for obtaining the nitro-leuco bases which embrace the well-known intermediate stages through which the synthesis of rosaniline passes when we proceed according to the data of O. Fischer, as given in "Berichte der Deutsch chem. Gesellschaft, XIII, p. 669." The mode of formation of the aforesaid bases from paranitrobenzylidene chloride, bromide, or anilide and aniline is seen by the following equations: $NO_2C_6H_4.CH:Ce_2 + 2C_6H_5.NH_2 = NO_2C_6H_4CH(C_6H_4NH_2)_2 + 2HCe$ $NO_2C_6H_4.CH:NC_6H_5 + C_6H_5NH_2.HCe = NO_2C_6H_4CH(C_6H_4NH_2)_2HCe$.

What I call "aniline" is the mixture of aniline toluidine and xylidine occurring in commerce and containing these bases in varying proportions.

In the preparation of the nitro-leuco bases I proceed as follows: Twenty parts of paranitrobenzylidene chloride dissolved in thirty to forty parts of a medium—such as ligroine, benzine, or alcohol—are allowed to act upon nineteen parts of aniline for several hours at the temperature of a water bath. The solvent is then distilled off, the residue extracted with water, and the solution obtained is filtered off from resinous products. The nitro-leuco base is precipitated from the filtrate by the addition of an alkali. The nitro-leuco base thus obtained varies in color from yellow to reddish yellow. It melts under the influence of boiling water to form a wax-like reddish-yellow mass. Its sulphate dissolves but sparingly in water, its hydrochloride but sparingly in concentrated hydrochloric acid. By the action of reducing agents it is converted into the leuco-base of rosaniline.

Having thus described my invention, what I claim as new, and desire to secure by Letters Patent, is—

As a new article of manufacture, the nitro-leuco base of rosaniline, varying in color from yellow to red, and possessing the special characteristics hereinbefore pointed out, substantially as specified.

In testimony whereof I have affixed my signature in presence of two witnesses.

EUG. FISCHER.

Witnesses:
A. S. HOGUE,
J. GRUND.